United States Patent [19]

Wisbey

[11] Patent Number: 4,557,790

[45] Date of Patent: Dec. 10, 1985

[54] TAPE LAMINATOR

[75] Inventor: Jerry D. Wisbey, Cincinnati, Ohio

[73] Assignee: Cincinnati Milacron Inc., Cincinnati, Ohio

[21] Appl. No.: 630,121

[22] Filed: Jul. 12, 1984

[51] Int. Cl.$^4$ ............................................. B32B 31/00
[52] U.S. Cl. .................................. 156/511; 156/178;
156/181; 156/196; 156/238; 156/249; 156/263;
156/296; 156/297; 156/303; 156/304.1;
156/306.3; 156/441; 156/519; 156/523;
156/540; 156/562; 156/574
[58] Field of Search ............... 156/196, 306.3, 238,
156/511, 249, 519, 263, 523, 296, 540, 297, 562,
303, 574, 304.1, 181, 178, 441

[56] References Cited

U.S. PATENT DOCUMENTS 3,713,933  1/1973  Sokolowski .................... 156/181

FOREIGN PATENT DOCUMENTS

WO84/00351  2/1984  PCT Int'l Appl. ................. 156/181
502409  8/1938  United Kingdom ............. 156/304.1
1531435  11/1978  United Kingdom ................ 156/181

Primary Examiner—John J. Gallagher
Attorney, Agent, or Firm—Thomas M. Farrell

[57] ABSTRACT

A tape laying machine is disclosed carrying a tape laminator unit which forms in situ from individual strips of composite material.

The strips are first spaced apart on a carrier sheet and next compressed to a relatively thin widened state where the widened strips are contiguous to one another, forming a unitary wide composite tape.

The tape is conveyed to a tape laydown station where it is transferred from the carrier sheet and deposited on a work surface.

9 Claims, 13 Drawing Figures

TAPE LAMINATOR

BACKGROUND OF THE INVENTION

This invention relates to the field of fabricating structures through progressive layers of composite tape.

Current composite tape laying equipment uses a fixed width, fixed thickness, pre-preg fabricated tape generally comprised, in part, of bundles of synthetic fibers or filaments known as "tows". The tows are bundled into a predetermined, untwisted grouping of fibers and are bonded with a material such as epoxy, which is B-staged or partially cured to a tacky state. The tape is dispensed by a tape laying head onto a mold surface, wherein successive plys of tape are utilized to build up a desired structure. After the structure is formed by the tape, the unit is thermally cured, often in a vacuum bag placed in an autoclave.

In current equipment, the tape is cut at the end of a "lay-down" pass to match the angle formed at the edge of the part. There exists a problem in being able to selectively compact the angled end portion of the tape to the part structure without also compacting the mating angled portion (tail) of the tape remaining on the dispensing reel. Further, this tail must be retracted in preparation for laying the next ply, or course, of tape. The problem of handling the tail is particularly apparent when using wide tape and cutting a steep angle, since these conditions result in a long tail being formed. On conventional state-of-the-art tape heads, the angle on the leading edge of the tape will be the complement of the angle cut on the end of the previously laid piece of tape. If this is not the required starting angle for the next lay the tape will then have to be recut before starting, or else trimmed off after laying, resulting in considerable waste of very expensive material.

Since conventional tape heads lay a constant width and constant thickness tape it is felt by the inventor that it would be an advantage to have a system where the thickness of the composite tape could be varied slightly to allow the tape to be feathered from a relatively thick section, for a highly stressed area, down to a thin section in a lightly stressed area. It is further felt that it would be desirable to have a tape laying head which can vary the width of the tape so that the tape may form openings or voids if desirable.

Conventional tape laying heads require a critical setting for the depth of cut taken by the tape cutter, since the cutter or knife must be capable of cutting through the composite tape entirely without shearing the backing paper. The backing paper is required to transport the tape and is subject to breaking if scored across its width.

Applicant has obviated the difficulties inherent in the conventional tape laying heads used in the field of composite tape structures, by means of a novel tape laminator which creates a predetermined quantity of relatively wide tape formed in situ on the machine from individually supplied relatively narrow bonded tows in the tape laying head.

SUMMARY OF THE INVENTION

The invention is shown embodied in a tape laying machine having a tape laminator for forming tape in situ on the machine from individual strips of composite material.

The tape laminator has a housing which contains a spacing mechanism to space incoming strips, or ribbons, or composite material from one another. A release-surfaced carrier sheet is trained from a supply reel, through the housing and a compacting unit, around a laydown roller, and ultimately wound on a take-up reel.

In the housing, the spaced-apart strips of composite material are deposited on the carrier sheet and cut to predetermined lengths. The sheet and strips are next passed through the compacting unit where at least one set of compacting rollers compress the strips on the carrier sheet to a thinned-out, widened, state where the ribbons are contiguous, thus forming a unitary wide composite tape on the carrier sheet.

The sheet is next passed under a roller or shoe at a laydown station where the tape is deposited on a work surface. In the preferred embodiment, the carrier sheet leaving the laydown station is gathered on a take-up reel.

DESCRIPTION OF THE PREFERRED EMBODIMENT

Figure 1:
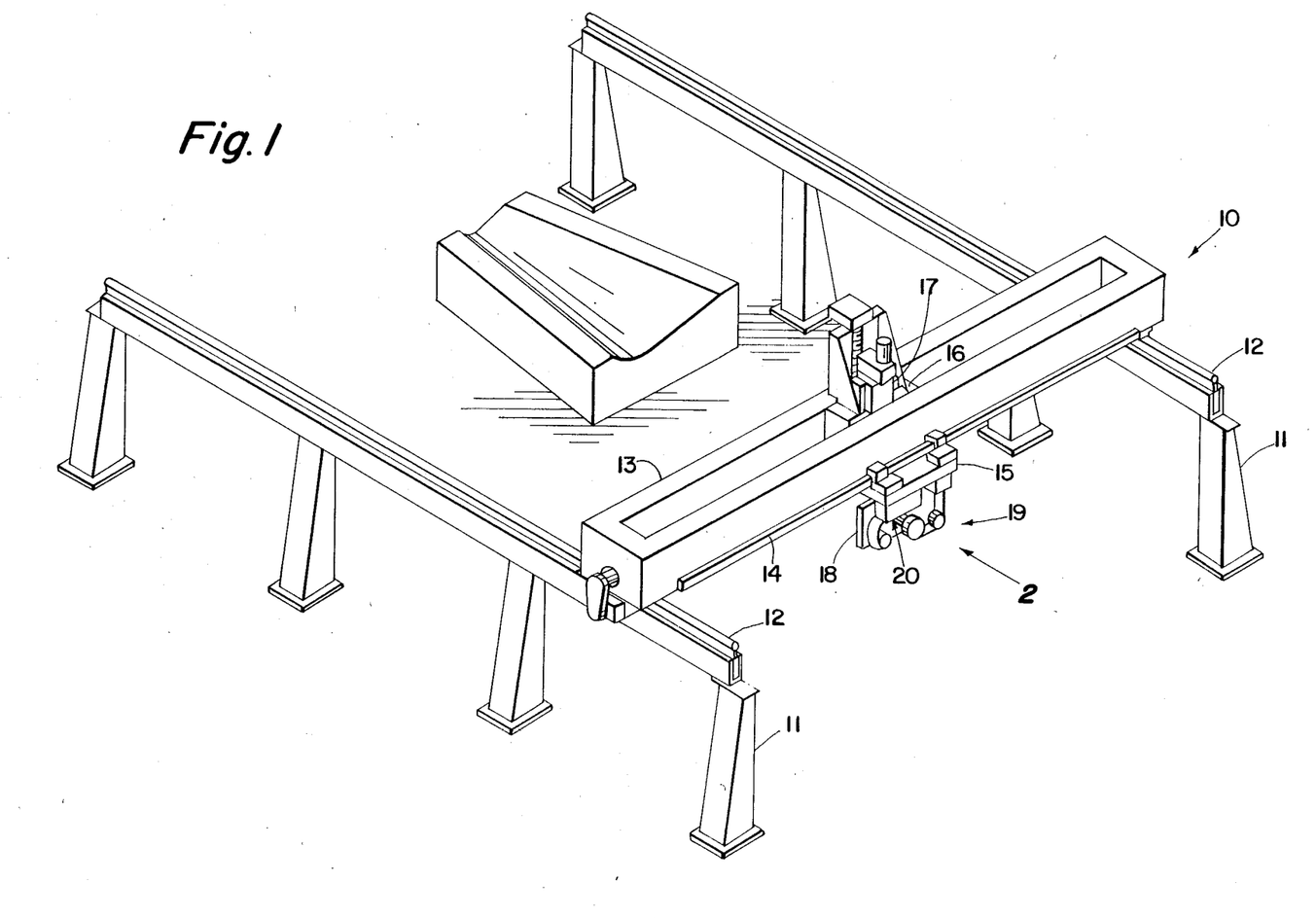
FIG. 1 is an isometric view of a tape laying machine having a tape laminator.

Referring to the drawings, FIG. 1 depicts a tape laying machine 10 for producing composite parts. The machine 10 has a base structure 11 with elevated horizontal ways 12 for supporting a bifurcated gantry 13 movable in an "X" direction along the ways 12. The gantry 13 has horizontal ways 14 extending at 90° to the base ways 12 and a saddle 15 is carried on the gantry ways 14 for movement in a "Y" direction. The saddle 15 has a vertical way system 16 which carries a vertical slide unit 17 for movement in a "Z" direction. The vertical slide unit 17 carries a tape head housing 18 which is rotatable on the vertical slide unit 17 about a "C" axis, i.e. around the vertical. The tape laying head 19 in the present invention comprises in part, a tape laminator 20 which, as will be described further, is a unit for forming a unitary wide tape in situ on the machine from individually-supplied bonded tows of composite material.

Figures 2, 6, 9:
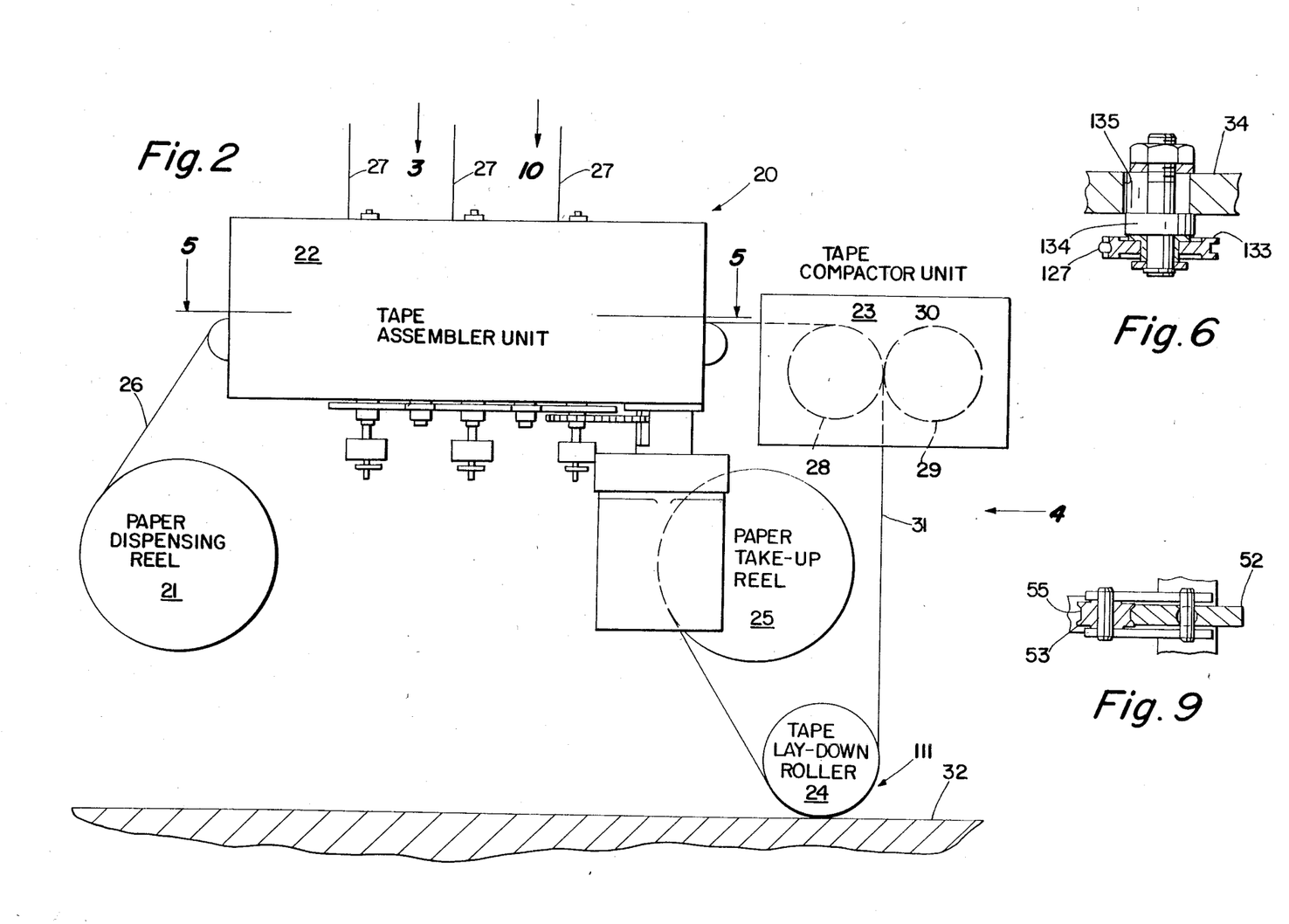
FIG. 2 is a side elevational view of the tape laminator of FIG. 1.
FIG. 6 is a section through the tension adjusting sprocket of the drive belt.
FIG. 9 is a plan section through the ribbon spacing guide rollers taken along the line 9—9 of FIG. 7.

FIG. 2 depicts the tape laminator 20 in elemental diagrammatic form, wherein the laminator 20 is comprised of the following main elements, all carried by the head housing 18: carrier dispensing reel 21; tape assembler unit 22; tape compactor unit 23; tape laydown roller 24; and carrier takeup reel 25. Certain details, such as bearing mounts for the tape laydown roller 24, carrier take-up reel 25, tape compactor unit, etc. have been omitted for purposes of clarity, but are deemed to be well within the ken of the ordinary machine designer.

The carrier dispensing reel 21 is rotatably supported and allows a paper carrier strip 26, or sheet, to be routed through the tape assembler unit 22. In the tape assembler unit 22 bonded tows, or "ribbons" 27, of composite material are received from overhead storage creels (not shown), and the ribbons 27 are deposited in predetermined spacings on the carrier strip 26. The carrier strip 26 and ribbons 27 continue from the tape assembler unit 22 into a tape compactor unit 23 which has a pair (multiple pairs, in some instances) of rolls 28,29, powered by a drive motor (not shown) and forming a nip 30 designed to receive and flatten the ribbons 27 on the paper carrier strip 26, thus creating contiguous bands of composite material which, in effect, form a wide tape 31 on the paper strip 26. The tape 31 and carrier strip 26 exit from the compactor unit 23 and are trained over a tape laydown roller 24, which transfers the sticky tape 31 to a part surface 32, or mold for building up a part surface. The carrier strip 26, once free of the composite tape 31, is gathered on a take-up reel 25. The rolls 28,29 are adjustably positioned with respect to one another to vary the opening at the nip 30. The rolls 28,29 may be adjusted by automatic means (not shown) so that tape 31 may be produced with varying cross-sectional thickness.

Here it may be noted that while the preferred embodiment utilizes a carrier strip 26 coated with a release agent, other materials may be substituted therefor. Also, it should be noted that the composite ribbon 27 may have various cross-sections including, but not limited to: rectangular; round; and oval.

Figure 3:
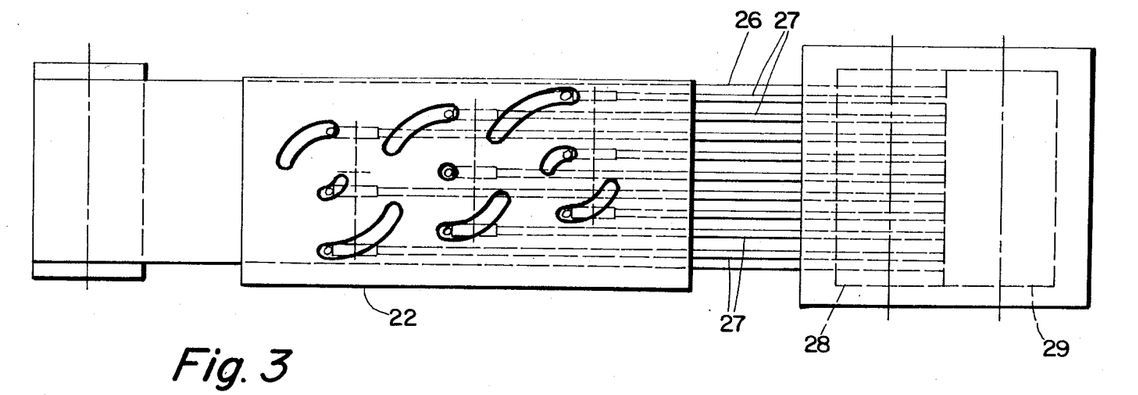
FIG. 3 is a plan view of the tape laminator taken in the direction of arrow 3 of FIG. 2.

FIG. 3 depicts the spaced ribbons 27 exiting the tape assembler unit 22. A plurality of ribbon spacing guide assemblies and a like number of corresponding cutter cam assemblies are located within the tape assembler unit 22 and will be discussed further in conjunction with FIGS. 5, 7 and 8.

Figure 4:
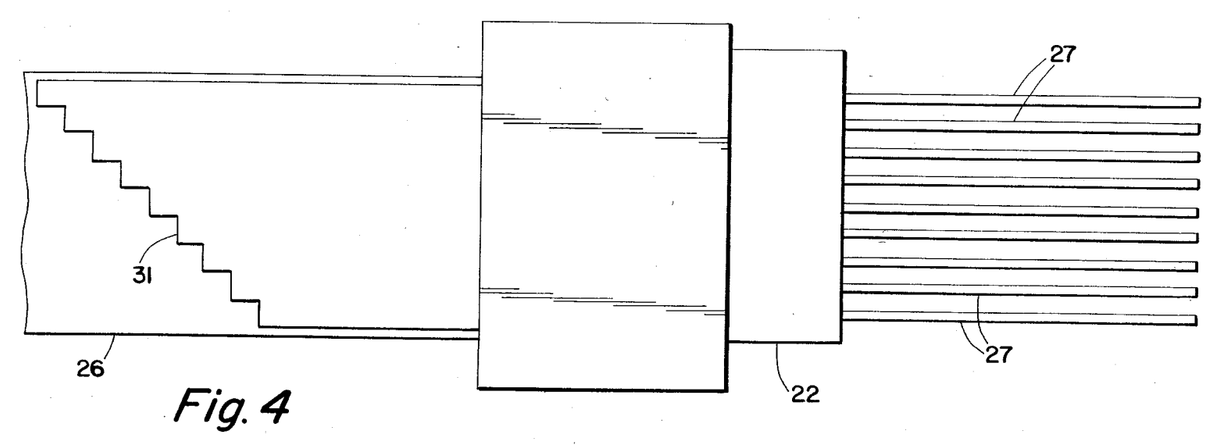
FIG. 4 is a front elevational view of the tape laminator taken in the direction of arrow 4 of FIG. 2.

The front view depicted in FIG. 4 shows the compacted ribbons 27 forming a wide tape 31 on the carrier strip 26. By proper sequencing of the start and stop points of the ribbon laydown on the carrier strip 26, angled profiles may be formed with the created tape 31 to facilitate edge-shaping, and custom-shaping of voids in the tape 31.

Figure 5:
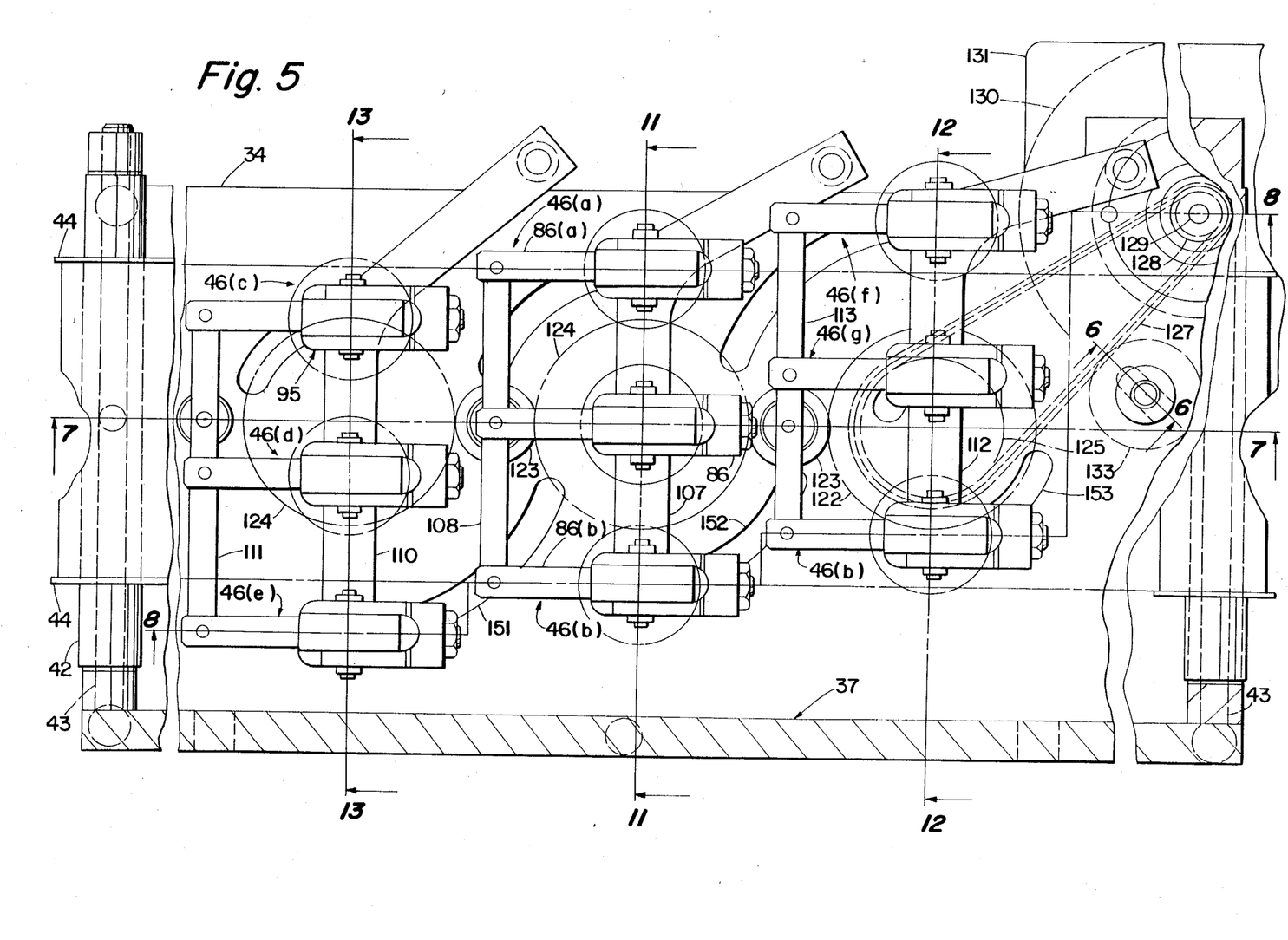
FIG. 5 is a plan section taken along the line 5—5 of FIG. 2.
Figure 7:
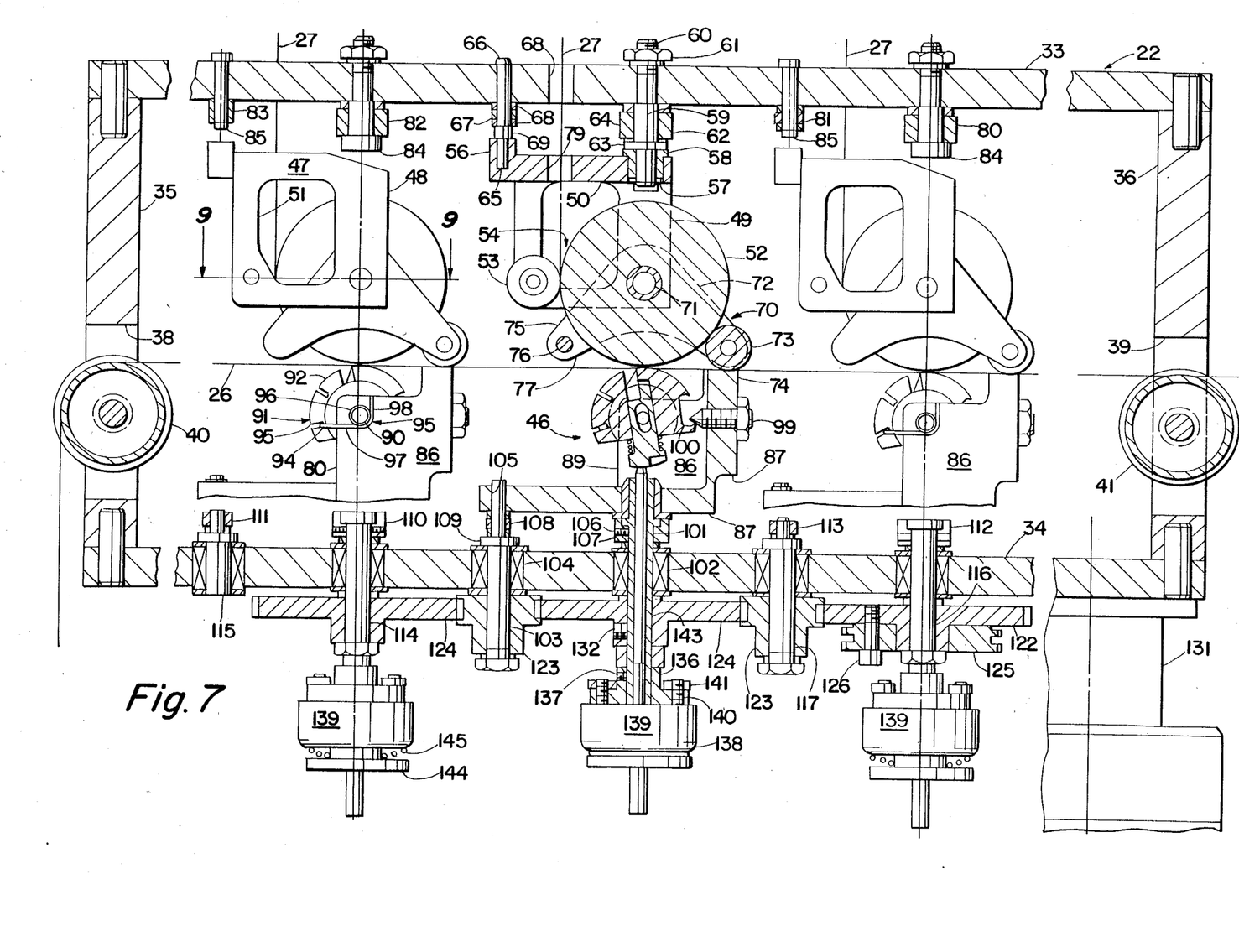
FIG. 7 is a side elevational section taken along the line 7—7 of FIG. 5.

Referring to FIGS. 5 and 7 taken through the tape assembler unit 22, the unit 22 has a basic frame comprised of upper and lower plates 33,34 rigidly attached to end plates 35,36 and one side plate 37. The end plates 35,36 have slots 38,39 machined therein, for the entry and exit of the carrier strip 26 across rear and front idler rollers 40,41 respectively. The tubular idler rollers 40,41 have end hubs 42 journalled for free rotation on shafts 43 held in the end plates 35,36. The rollers 40,41 have spaced hub flanges 44 for guiding the carrier strip 26. The carrier strip 26 passes between a given ribbon spacing guide assembly 45 and its respective cutter cam assembly 46. It can be seen that multiple assemblies are required, i.e. one set of ribbon spacing guide assembly 45 and cutter cam assembly 46 is required for each ribbon 27 of composite material. In the present embodiment, nine ribbons 27 of composite material have been depicted, but it may be appreciated that the amount of ribbons 27 may be increased or reduced to suit the particular application.

Ribbon Spacing Guide Assembly

The ribbon spacing guide assembly 45 has a clevis-type carrier bracket 47 which has downwardly-extending walls 48,49 and a central web 50 joining the walls 48,49. An access hole 51 is machined through each wall 48,49. The walls 48,49 have a pair of rollers 52,53 journalled for rotation therewith, and forming a nip 54 between the rollers 52,53. FIG. 9 shows that the rear roller 53 has an annular groove 55 to guide the ribbon 27. The rear of the web 50 has a rectangular boss 56 extending upwardly. The front of the web 50 has a vertical bore 57 journalled on a shoulder bushing 58 and a fixed pin 59 received in the top plate 33. The pin 59 has a threaded stud portion 60 received in the plate 33, and secured with a lock nut 61, and has a slightly increased shoulder diameter 62 extending from the plate 33 to a collar portion 63 located intermediate the plate 33 and the bushing 58. The shoulder diameter 62 of the pin 59 journals a pivotal, straight link bar 64. The rearward boss 56 of the bracket 47 has a pilot hole 65 in which is received a pin 66 stationarily held in the top plate 33. A second pivotal link bar 67 is journalled around the pin 66 and prevented from axial movement by virtue of washers 68 and a collar 69 integral with the pin 66. The pins 59,66 serve to keep the assembly 45 aligned with the carrier strip 26.

A two-legged equalizing bracket 70 is received on the journal pin 71 for the front roller 52 received between the side walls 48,49. One leg 72 of the equalizing bracket 70 carries a rotary wheel 73 which bears against both composite ribbon 27 and a back-up anvil portion 74 of a cutter cam assembly 46. The other leg 75 of the equalizing bracket 70 has a stationary pin 76 with a torsion spring 77 thereon to keep tension against a ribbon 27 riding on the roller 52 and to prevent back motion of the ribbon 27 after cutting.

Figure 11:
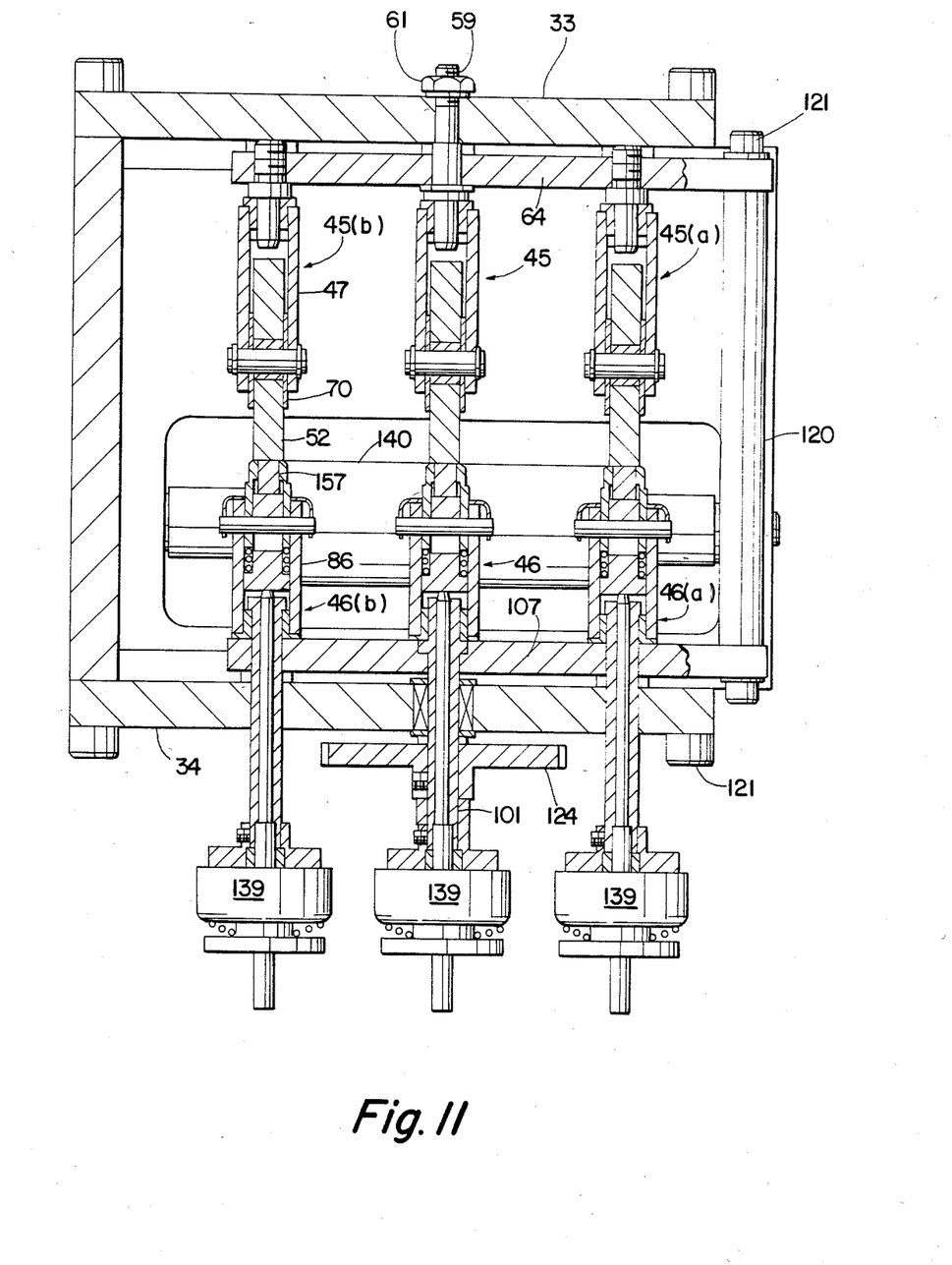
FIGS. 11, 12, and 13 are front elevational sections through the unit of FIG. 5.
Figure 12:
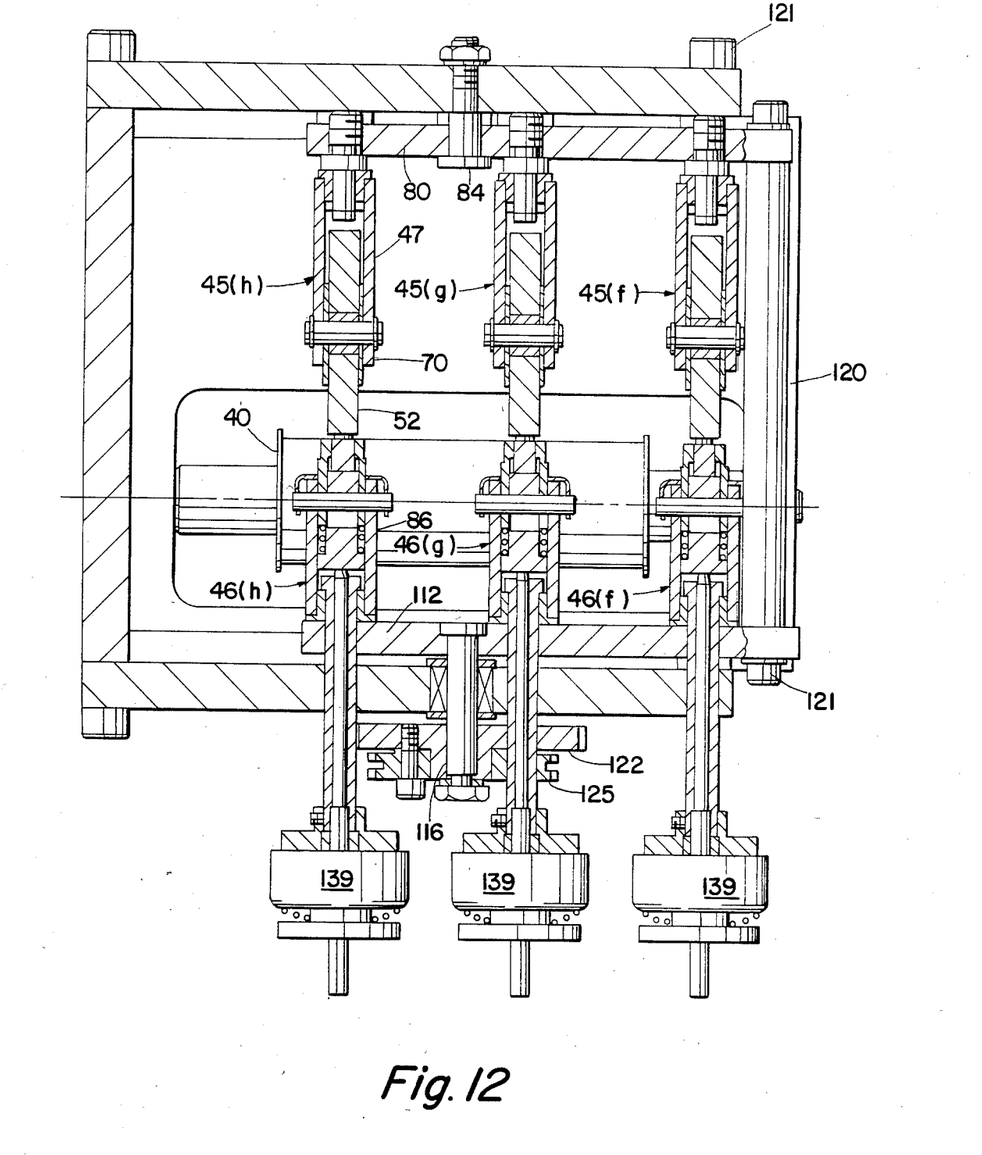
Figure 13:
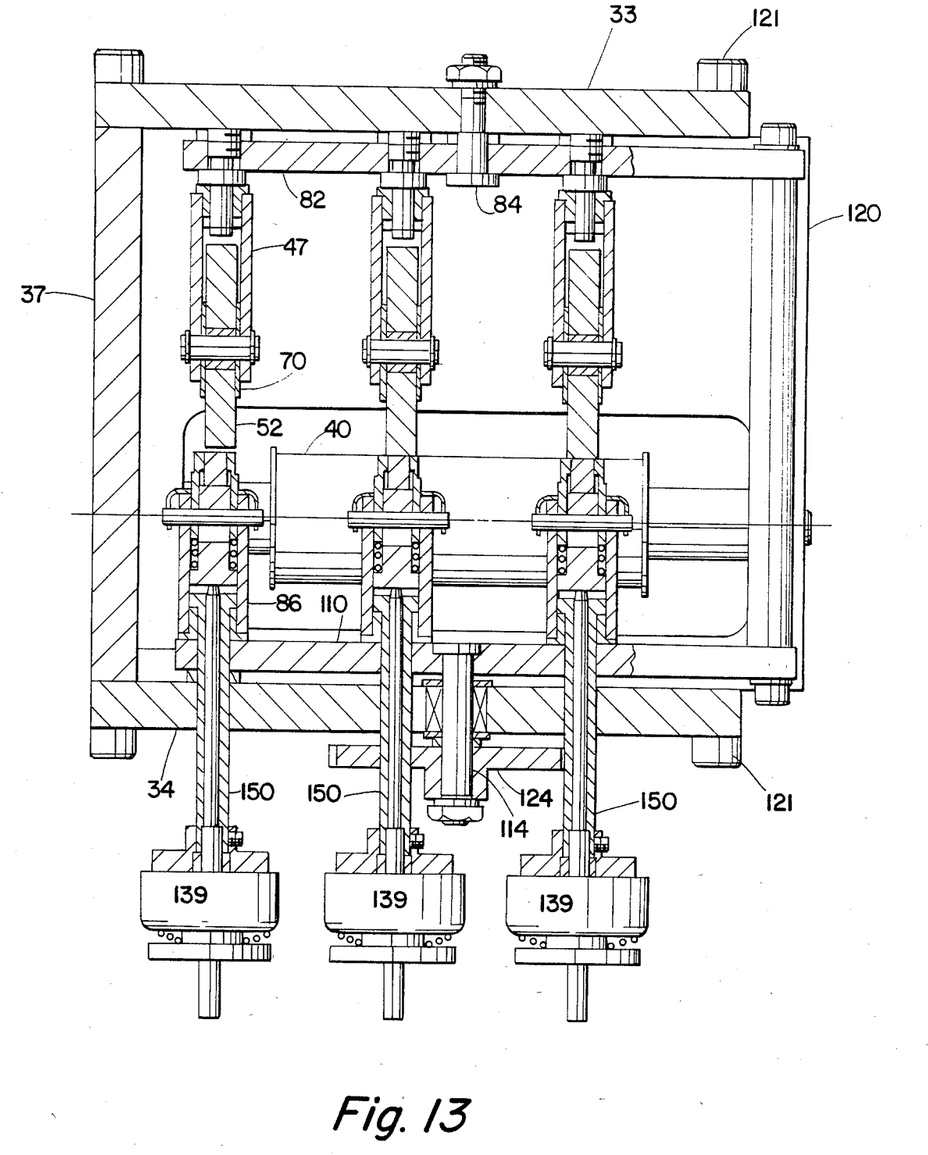

A ribbon 27 of composite material is first received through a vertical slot 78 in the top plate 33, and extends downward through a vertical slot 79 in the web 50 of the bracket 47, passing into the nip 54 of the two rollers 52,53. The ribbon 27 then wraps around the front roller 52 and extends across and under the wheel 73 of the equalizing bracket 70. The center ribbon spacing guide assembly 45 of the middle side-by-side trio of guide assemblies 45 shown is the only one securely attached to the top plate 33. In the remaining offset trios of guide assemblies 45, only the link bars 80,81,82,83 are held in a fixed relationship with the top plate 33, by respective short-headed pins 84,85 at the front 80,81 and rear 82,83 link bars. All of the remaining spacing guide assemblies 45 depend from their two link bars respectively of a given trio set of guide assemblies 45, as shown in FIGS. 11, 12, 13.

Cutter Cam Assembly

The cutter cam assembly 46 is comprised of a bracket 86 having a bottom plate 87 attached to an upwardly-extending anvil portion 74 which terminates at the carrier strip 26. A pair of side walls 88,89 are affixed to the bracket 86 and the side walls 88,89 carry a horizontal pin 90, upon which is journalled a cutter cam unit 91.

Each cutter cam unit 91 has a rotary cam 92 supported between the side walls 88,89 of the bracket 86. The cam 92 has a radial slot 93 receiving a transverse portion 94 of a torsion spring 95. The spring 95 has coils 96 at each side of the bracket journalled on the pin 90. The spring coils 96 each have a horizontal leg 97 joining with the transverse portion 94, and a vertical section 98 is hooked over the top of the bracket 86, to bias the cam 92 in a counter-clockwise direction. A set screw 99 received in the anvil portion 74 of the bracket 86 extends into a wide circumferential slot 100, or relief, to limit the bidirectional movement of the cam 92.

The bracket 86 is carried in a rotary slip-fit on a forward vertical pin 101 which extends through a bearing set 102 located in the bottom plate 34. A second pin 103 extends through a second bearing set 104 in the bottom plate 34 and is fitted into a rear vertical hole 105 in the bracket 86. The intermediate portion of the forward pin, between the bracket 86 and the lower plate 34, is affixed by a screw 106 to a first rigid link bar 107 extending sideways as shown in FIGS. 5 and 11. A second link bar 108 is journalled for rotation on the rear pin 103, between a shoulder 109 of the pin 103 and the bracket 86, and the link bar 108 extends transversely to the two side brackets 86(a)(b), shown in FIG. 5. Here it should be noted that the front and rear pins 101,103 extend into the bracket 86 of only the centermost cutter cam assembly 46 of the middle side-by-side trio of assemblies 46, whereas all remaining assemblies 46(a)-(h) are pinned to respective front and rear link bars 110,111,112,113, alone, and not into the lower plate 34.

Figure 8:
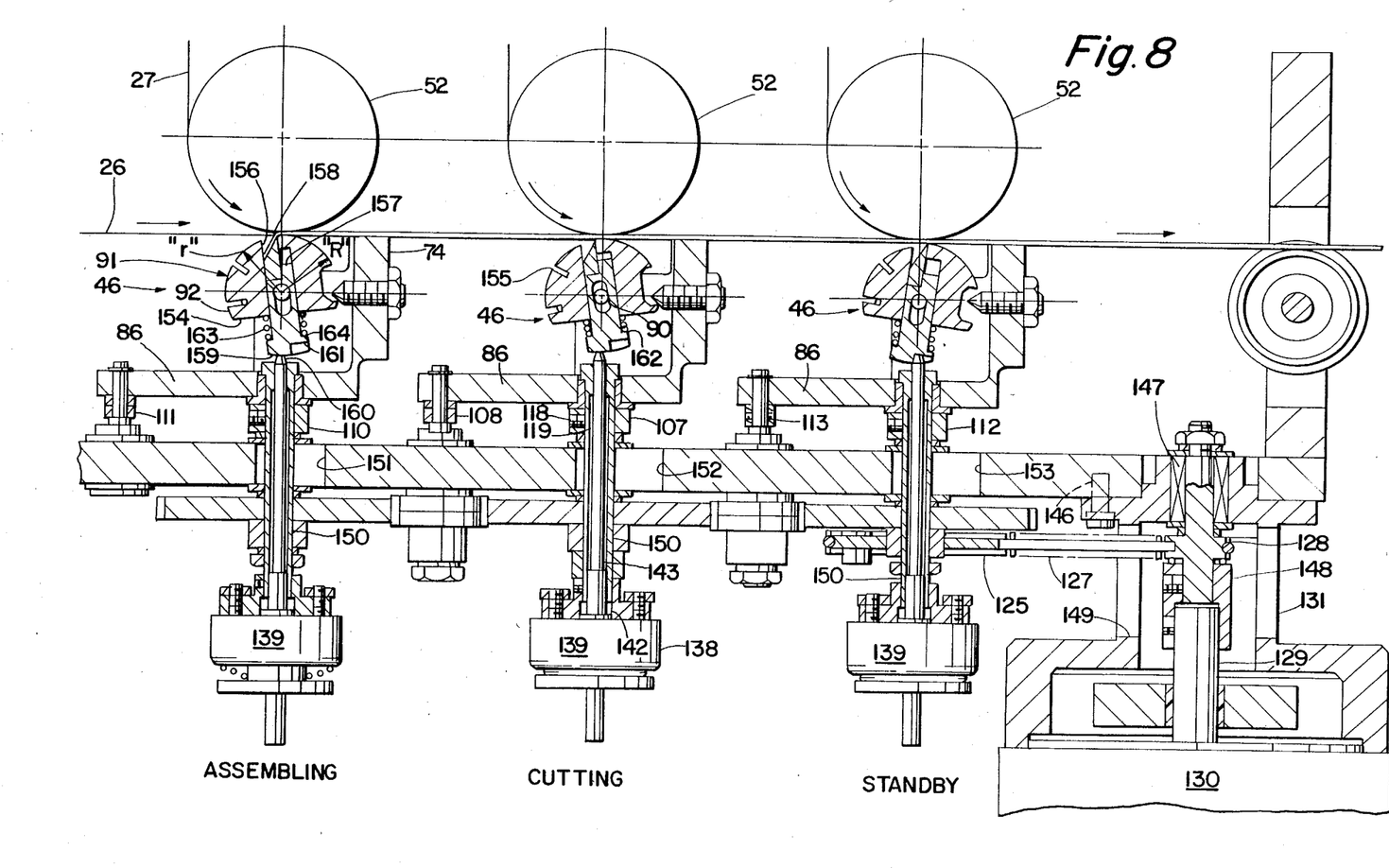
FIG. 8 is a side elevational section taken along the line 8—8 of FIG. 5 showing successive movements of the cutter cam assembly.

The front and rear link bars 110,111,112,113 of the remaining trios of cutter cam assemblies 46(c)-(h) are journalled for rotation with their respective journal pins 114,115,116,117 in the lower plate 34. There are no upper extensions from the lower plate journal pins 114–117 (see FIGS. 7, 12 and 13). The remaining side assemblies 46(a)(b) of the central trio of assemblies 46 are journalled for rotation on hollow pins 150 received in the linkage bars and secured with set screws 118 having dog points 119 (FIG. 8). The outboard ends of the upper and lower linkage bars 64,107 (FIG. 11, 12 and 13) are tied together by a post 120 having end screws 121 so they will move in unison. The lower extensions of the journal pins 103,114,116,117 received in the lower plate 34 are affixed to gears 122,123,124 drivingly connected to one another. A driven sprocket 125 is affixed to the first gear 122 by screws 126, and is connected through a cog belt 127 to a drive sprocket 128 affixed to the shaft 129 of a drive motor 130 received on a bracket 131 mounted to the lower plate 34. The center gear 124 is affixed to the center forward vertical pin 101 by a screw 132.

FIG. 6 depicts an idler sprocket freely journalled on a threaded stud 134 which is radially movable in an elongate clearance slot 135 in the bottom plate 34 to adjust tension on the cog belt 127.

Figure 10:
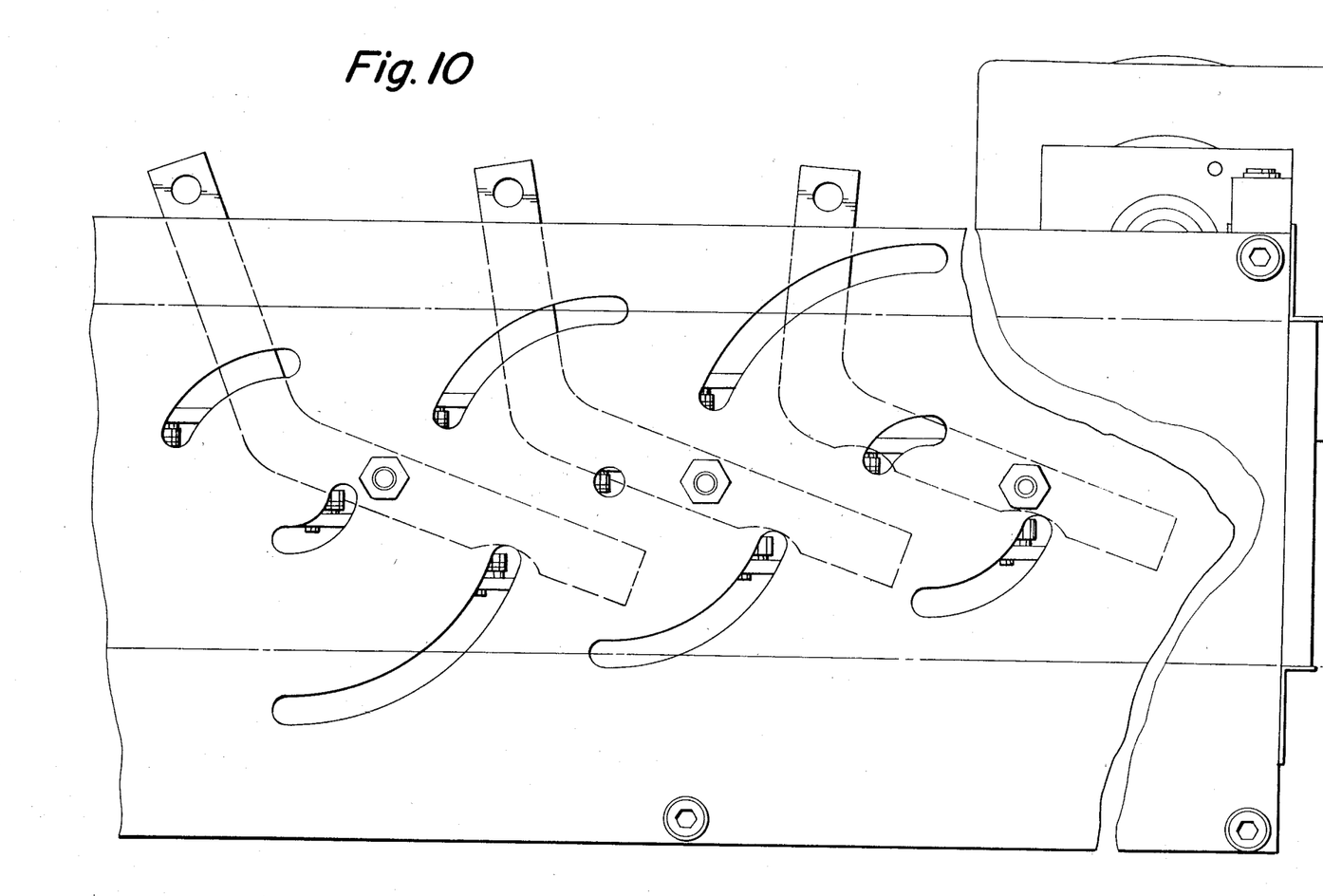
FIG. 10 is a plan view taken in the direction of arrow 10 of FIG. 2, showing the elements of FIG. 5 in an alternate position.

In the assemblies shown in FIGS. 5, 7, and 8, it can be seen that rotation of the drive sprocket 128 causes the gears 122,123,124 to rotate their respective link bar assemblies, which are in fact four bar linkages, creating parallelograms of ribbon spacing guide assemblies 45 on top of the tape 31 and cutter cam assemblies 46 below the tape 31, so that the assemblies 45,46 remain parallel even though shifted sideways to vary the spacing of the ribbons 27 as shown in FIG. 10.

The forward vertical pin 101 of the central bracket 86 is hollow, and has an adapter flange 136 affixed to its bottom portion by a set screw 137. The adapter flange 136 carries the coil 138 of a solenoid actuator 139 by studs 140 and locknuts 141 received with the flange 136.

The solenoid armature 142 extends into the pin 101 and supports an actuator rod 143, which is slidably supported and extends from the top of the pin 101. The armature 142 has a bottom plate 144 biased in a downward direction by a conical compression spring 145.

Referring to FIG. 8, the sectional view shows the motor mounting bracket 131 secured to the bottom plate 34 by screws 146. The bracket 131 carries bearings 147 which support the drive sprocket 128, and a coupling 148 ties the sprocket 128 to the motor shaft 129. A side opening 149 is provided through the bracket 131 so that the cog belt 127 may be trained over the drive sprocket 128 and the drive sprocket 125.

The three cutter cam units 91 and brackets 86 shown typify the mounting of the assemblies 46 of all but the center one shown in FIG. 7. The brackets 86 are supported for translatory movement on their respective link bars 107,108,110,111,112,113. The brackets 86 are journalled on hollow forward vertical pins 150 secured to the link bars 107,110,112. The pins 150 depend from the link bars 107,110,112 and extend through clearance slots 151,152,153 in the bottom plate 34.

In a similar fashion to the vertical pin 101 of the central bracket 86, each pin 150 carries a relatively stationary coil 138 of a solenoid actuator 139 at its lowermost end. The movable armature 142 of the solenoid actuator 139 supports an actuator rod 143 which is slidable in the hollow pin 150.

The cam 92 of the cutter cam unit 91 is generally flat and D-shaped, with the chordal surface being the base 154. An alternate radial slot 155 is provided to increase the spring force, if desired. The cam has a central radial slot 156 extending upward from the base 154, and an elongate knife 157 is slidably received in the slot 156. The knife 157 has a chisel point 158 at the top and a circular surface 159 at the bottom in contact with the tapered end 160 of the actuator rod 143. A relief 161 is provided at the right of the surface 159. An elongate slot 162 in the knife 157 permits movement of the knife 157 on the horizontal pin 90 of the bracket 86. A compression spring 163 received on the knife 157 reacts against the cam base 154 and a knife shoulder 164 to bias the knife 157 in a downward direction.

The cam profile is comprised of two radii. The major radius "R" is generated from the pin 90 and extends to the right of center (relative to the knife slot 156). The radius "R" is sized to urge paper carrier strip 26 upward against the composite ribbon 27 and roller 52. The minor radius "r" is also generated from the pin 90 and extends to the left of center (relative to the knife slot 156). The radius "r" is sized to clear the carrier strip 26 as the cam 92 is rotated.

Cutter Cam Operation

FIG. 8 shows three cutter cam assemblies 46 in different modes of operation, which have been labeled from left-to-right: "Assembling"; "Cutting"; and "Standby".

In the "Assembling" mode, the solenoid actuator 139 is de-energized, and the cam 92 is biased in a CCW direction, urging the carrier strip 26 upward against the roller 52 and composite ribbon 27. The ribbon 27 and strip 26 then pass across the anvil portion 74 of the bracket 86.

In the "Cutting" mode, the solenoid actuator 139 is energized, forcing the actuator rod 143 and knife 157 upward thereby puncturing the strip 26 and severing the composite ribbon 27. Continued movement of the paper strip 26 during the "Cutting" mode causes rotation of the cam 92 in a CW direction. When the knife relief 161 reaches the end 160 of the actuator rod 143, the knife 157 will snap downward under the influence of the knife biasing spring 163. At this point the clearance radius "r" is under the paper strip 26, and the solenoid actuator 139 is still energized. the roller 52 ceases rotation since the incoming ribbon 27 is out of contact with the moving carrier strip 26.

To restart ribbon movement, the solenoid actuator 139 is then de-energized, thereby causing the cam 92 to rotate in a CCW direction under the influence of the torsion spring 95. When returned thusly to the "Assembling" position, the major radius "R" of the cam 92 will deflect the strip 26 upward against the composite ribbon 27 and roller 52, reattaching the sticky ribbon 27 to the paper strip 26.

The individual ribbons 27 can be served and restarted at will, independent from one another, to form various tape profiles which will pass from the tape assembler unit 22 and into the taper compactor unit 23.

After leaving the tape compactor unit 23 the tape 31 continues to the tape laydown roller 24 at a tape laydown station which is substantially the same as that in conventional type laying machines. The carrier strip 26 exiting the tape laydown station is gathered on a take-up reel 25.

While the invention has been shown in connection with a preferred embodiment, the invention is not limited to such embodiment, but rather the invention extends to all designs and modifications as come within the scope of the appended claims.

What is claimed is:

1. A tape laying machine, comprising in combination:
   (a) a machine base having a substantially horizontal base way system defining an X-direction of travel;
   (b) a gantry supported on said base way system and having a substantially horizontal gantry way system defining a Y-direction of travel;
   (c) a saddle supported on said gantry way system and having a substantially vertical saddle way system defining a Z-direction of travel;
   (d) a vertical slide supported on said saddle way system and having a rotary way system defining a rotary C-axis of movement;
   (e) a tape head base mounted to said rotary way system;
   (f) drive means for moving said tape head base in X, Y, Z, and C directions;
   (g) a tape laminator affixed to said tape head base, comprising:
      (1) a housing;
      (2) a carrier sheet movable with respect to said housing;
      (3) means for spacing a plurality of relatively thick strips of compressible material from one another and depositing said spaced strips on said carrier sheet;
      (4) means for cutting said strips to predetermined lengths; and
      (5) means for compressing said strips on said carrier sheet to form relatively thin widened strips which are contiguous to one another, creating a unitary wide tape;
   (h) means for advancing said carrier sheet and said wide tape to a tape laydown station defined on said tape head;
   (i) means for depositing said wide tape on a designated work surface relatively located at said tape laydown station; and
   (j) means for transporting said carrier sheet from said tape laydown station after depositing said tape.

2. The tape laying machine of claim 1, further comprising a work support base positioned within the range of machine movement in the X, Y, Z and C directions.

3. The tape laying machine of claim 1, wherein said means for advancing said carrier sheet and said means for transporting said carrier sheet each comprise, in part, a reel mechanism for reeling said carrier sheet from a supply reel to a storage reel, respectively.

4. The tape laying machine of claim 1, wherein said means for spacing said strip comprises a linkage mechanism defining a plurality of strip operating positions movable with respect to said housing, and further comprising supply means for feeding said plurality of strips to said strip operating positions.

5. The tape laying machine of claim 1, further comprising means for feeding said strips into a strip spacing assembly.

6. The tape laying machine of claim 5, further comprising means for interrupting feed movement of said strip and for restarting feed movement of said strip at a predetermined time.

7. The tape laying machine of claim 1, wherein said means for cutting said strips includes cutter means for cutting said strips from the side of said carrier sheet opposite that on which the strips are deposited.

8. A tape laying head, comprising in combination:
   (a) a tape head base;
   (b) a tape laminator affixed to said tape head base, comprising:
      (1) a housing;
      (2) a carrier sheet movable with respect to said housing;
      (3) means for spacing a plurality of relatively thick strips of compressible material from one another and depositing said spaced strips on said carrier sheet; and
      (4) means for compressing said strips on said sheet to form relatively thin widened strips which are contiguous to one another, creating a unitary wide tape
   (c) means for advancing said carrier sheet and said wide tape to a tape laydown station, said means for advancing being mounted to said tape head base;
   (d) means for depositing said wide tape on a designated work surface at said tape laydown station; and
   (e) means for transporting said carrier sheet from said tape laydown station after depositing said tape.

9. The tape laying machine of claim 8, further comprising means for cutting said strips from the side of said carrier sheet opposite that on which the strips are deposited.

* * * * *